US012237127B2

(12) United States Patent
Ha

(10) Patent No.: US 12,237,127 B2

(45) **Date of Patent: *Feb. 25, 2025**

(54) CIRCUIT BREAKER WITH INTEGRAL FUSE MOUNTING STUD

(71) Applicant: MP Hollywood, Lombard, IL (US)

(72) Inventor: Cuong Ha, Lincolnwood, IL (US)

(73) Assignee: MP Hollywood, Lombard, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,938

(22) Filed: Nov. 13, 2023

(65) Prior Publication Data

US 2024/0161988 A1 May 16, 2024

Related U.S. Application Data

(63) Continuation of application No. 17/484,887, filed on Sep. 24, 2021, now Pat. No. 11,817,280.

(51) Int. Cl.

*H01H 37/52* (2006.01)
*H01H 71/08* (2006.01)
*H01H 85/02* (2006.01)

(52) U.S. Cl.

CPC ............ *H01H 37/52* (2013.01); *H01H 71/08* (2013.01); *H01H 85/0241* (2013.01); *H01H 2085/0258* (2013.01)

(58) Field of Classification Search

CPC .... H01H 37/52; H01H 71/08; H01H 85/0241; H01H 2085/0258; H01H 71/16

See application file for complete search history.

(56) References Cited

U.S. PATENT DOCUMENTS

| | | | | |
|---|---|---|---|---|
| 2,317,552 A * | 4/1943 | Parsons | H02J 3/04 | 361/62 |
| 2,329,053 A * | 9/1943 | Jennings | H01H 71/40 | 335/23 |
| 3,248,500 A * | 4/1966 | Cellerini | H01H 9/10 | 337/186 |
| 4,603,312 A * | 7/1986 | Conner | H01H 71/7463 | 74/522 |
| 5,004,994 A * | 4/1991 | Korczynski | H01H 73/28 | 337/68 |
| 5,021,761 A * | 6/1991 | Stack | H01H 73/24 | 337/365 |
| 6,538,549 B1 * | 3/2003 | Renne | H01H 73/28 | 337/55 |

(Continued)

*Primary Examiner* — Stephen S Sul

(74) *Attorney, Agent, or Firm* — Knobbe, Martens, Olson & Bear, LLP

(57) ABSTRACT

A circuit breaker device includes a bimetallic overcurrent protection element which is configured to be placed in series with an integrated replaceable fuse. The replaceable fuse may be faster-acting than the bimetallic overcurrent protection element, and may be higher-rated than the bimetallic overcurrent protection element. The circuit breaker device may include an electrically isolated terminal stud having a height sufficient to retain the replaceable fuse thereon, the electrically isolated terminal stud not directly connected to the bimetallic overcurrent protection element, so that current can only flow through the bimetallic overcurrent protection element when a replaceable fuse comprising an intact fuse element is supported on the electrically isolated terminal stud.

18 Claims, 14 Drawing Sheets

1

(56) References Cited

U.S. PATENT DOCUMENTS

| | | | | |
|---|---|---|---|---|
| 6,902,434 | B2 * | 6/2005 | Stack | H01M 50/552 439/620.28 |
| 6,932,650 | B1 * | 8/2005 | Freitag | H01R 13/68 439/761 |
| 7,382,223 | B2 * | 6/2008 | Krishnamurthy | H01H 73/24 337/72 |
| 7,808,361 | B1 * | 10/2010 | Yu | H01H 37/761 337/13 |
| 8,669,840 | B2 * | 3/2014 | Urrea | H01H 85/12 337/191 |
| 9,159,985 | B2 * | 10/2015 | Nakanishi | H01M 50/581 |
| 2003/0206094 | A1 * | 11/2003 | Korczynski | H01H 73/24 337/333 |
| 2006/0164192 | A1 * | 7/2006 | Korczynski | H01R 13/6658 335/16 |
| 2010/0133078 | A1 * | 6/2010 | Majewski | H01H 71/08 200/293 |
| 2011/0148564 | A1 * | 6/2011 | Staylor | H01H 85/2045 337/191 |
| 2013/0322050 | A1 * | 12/2013 | David | H01H 71/0228 361/824 |
| 2016/0012984 | A1 * | 1/2016 | Grady | H01H 89/00 337/6 |
| 2022/0310348 | A1 * | 9/2022 | Schwartz | H01H 85/143 |

* cited by examiner

CIRCUIT BREAKER WITH INTEGRAL FUSE MOUNTING STUD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to U.S. patent application Ser. No. 17/484,887, filed Sep. 24, 2021, the disclosure of which is hereby incorporated by reference in its entirety.

BACKGROUND

Technical Field

The disclosed technology relates to circuit breakers, and in particular to circuit breakers including a secondary, replaceable overcurrent protection device.

Description of Certain Art

A wide variety of overcurrent protection structures can be used to protect electrical circuits from electrical currents in excess of the circuit design limits. These overcurrent protection devices include, but are not limited to, circuit breakers and fuses.

Fuses can be single-use overcurrent protection devices, which can be irreparably damaged after being exposed to a current in excess of the raking of the fuse. Replacement of single-use fuses after exposure to an overcurrent can be an expensive and time-consuming process. In many implementations, such as in a marine application, a suitable replacement fuse may not be readily available for use as a replacement.

The use of a resettable circuit breaker can allow restoration of the operation of a circuit after exposure to an overload, by resetting the circuit breaker to re-establish continuity once the overload condition is resolved. This can be done with no additional cost to the user, and no need to obtain a replacement component if the overload condition occurs in a remote location without ready access to replacement parts.

SUMMARY

In one broad aspect, a thermally activated overcurrent circuit breaker device is provided, including a housing. a first terminal extending into the housing and in electrical communication with a first terminal contact. a second terminal extending into the housing and in electrical communication with a bimetallic overcurrent protection element located at least partially within the housing. and a terminal post extending through an aperture in the first terminal, the terminal post not in direct electrical contact with the first terminal.

The bimetallic overcurrent protection element can be configured to change shape in response to electrical current above a threshold breaker current value. The bimetallic overcurrent protection element can be configured to change shape between a first position in which the bimetallic overcurrent protection element forms part of an electrical connection with the first terminal contact when the bimetallic overcurrent protection element is in the first position. and a second position in which the bimetallic element is shaped such that the bimetallic overcurrent protection element is not in electrical communication with the first terminal contact. The bimetallic overcurrent protection element can be configured to change shape between the second position and the first position upon cooling due to a decrease in current flowing through the bimetallic element when the bimetallic element is in the second position.

The circuit breaker can further include a reset mechanism configured to contact the bimetallic overcurrent protection element to manually reset the bimetallic overcurrent protection element from the second position to the first position. The circuit breaker can further include a manual trip mechanism configured to move the bimetallic element from the first position to the second position.

In another broad aspect, a circuit breaker device is provided, including a housing, a first terminal stud in direct electrical communication with a first electrical contact located within the housing via a first electrical terminal, the first electrical terminal extending between the first electrical contact and the first terminal stud. a second terminal stud not in direct electrical connection with a second electrical contact located within the housing via a second electrical terminal, the second electrical terminal extending between the second electrical contact and an external portion of the second electrical terminal, the external portion of the second electrical terminal spaced apart from the second terminal stud by a distance sufficient to electrically isolate the second electrical terminal from the second terminal stud. and a thermally activated overcurrent protection element located within the breaker housing and configured to change shape, in response to current exceeding a breaker threshold voltage passing therethrough, between a closed position in which the thermally activated overcurrent protection element forms part of an electrical connection between the first electrical terminal and the second electrical terminal, and an open position in which the first electrical terminal is in electrical communication with the second electrical terminal.

The second terminal stud can be dimensioned to retain an integrated removable fuse device supported thereon, and the integrated removable fuse device can include a fuse section configured to be placed in electrical communication with the external portion of the second electrical terminal. The external portion of the second electrical terminal can include an aperture extending through the external portion of the second electrical terminal, the aperture having a cross-sectional diameter which is larger than a cross-sectional diameter of a portion of the second electrical stud extending therethrough. The second terminal stud can be located on a line side of the circuit breaker device, and the first terminal stud can be located on a load side of the circuit breaker device.

In another broad aspect, a circuit breaker device is provided, the circuit breaker device including a thermally activated bimetallic overcurrent protection device configured to change shape, in response to a current exceeding a breaker threshold current, between a first position in which the thermally activated bimetallic overcurrent protection device forms part of an electrical connection between a first terminal and a second terminal, and a second position in which the first terminal is not in electrical communication with the second terminal. a first terminal stud configured to receive a first application wire termination thereon, the first terminal stud in direct electrical connection with the first terminal. a second terminal stud configured to receive a second application wire termination thereon, the second terminal stud spaced apart from the second terminal by a distance sufficient to electrically isolate the second terminal from the second terminal stud. and an integrated replaceable fuse supported by the second terminal stud and including a fuse element configured to fuse open in response to current exceeding a fuse threshold current, the integrated replaceable fuse configured to place the second terminal in electrical communication with a second application wire termination received on the second terminal stud via an electrical path passing through the fuse element of the integrated replaceable fuse.

The fuse threshold current can be higher than the breaker threshold current. The integrated replaceable fuse can have a fuse delay period before fusing open in response to current exceeding the fuse threshold current, and where the thermally activated bimetallic overcurrent protection device can have a breaker delay period before moving from the first position to the second position in response to current exceeding the breaker threshold current, where the breaker delay period is longer than the fuse delay period.

The integrated replaceable fuse can include an upper electrical fuse contact point on a first face of the integrated replaceable fuse electrically connected to a lower electrical fuse contact point on a second face of the replaceable fuse opposite the first face of the replaceable fuse via the fuse element, the upper electrical fuse contact point configured to be placed in direct contact with a second application wire termination supported on the second terminal stud, and the lower electrical fuse contact point configured to be placed in direct contact with a portion of the second terminal.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise.

Figure 1A:
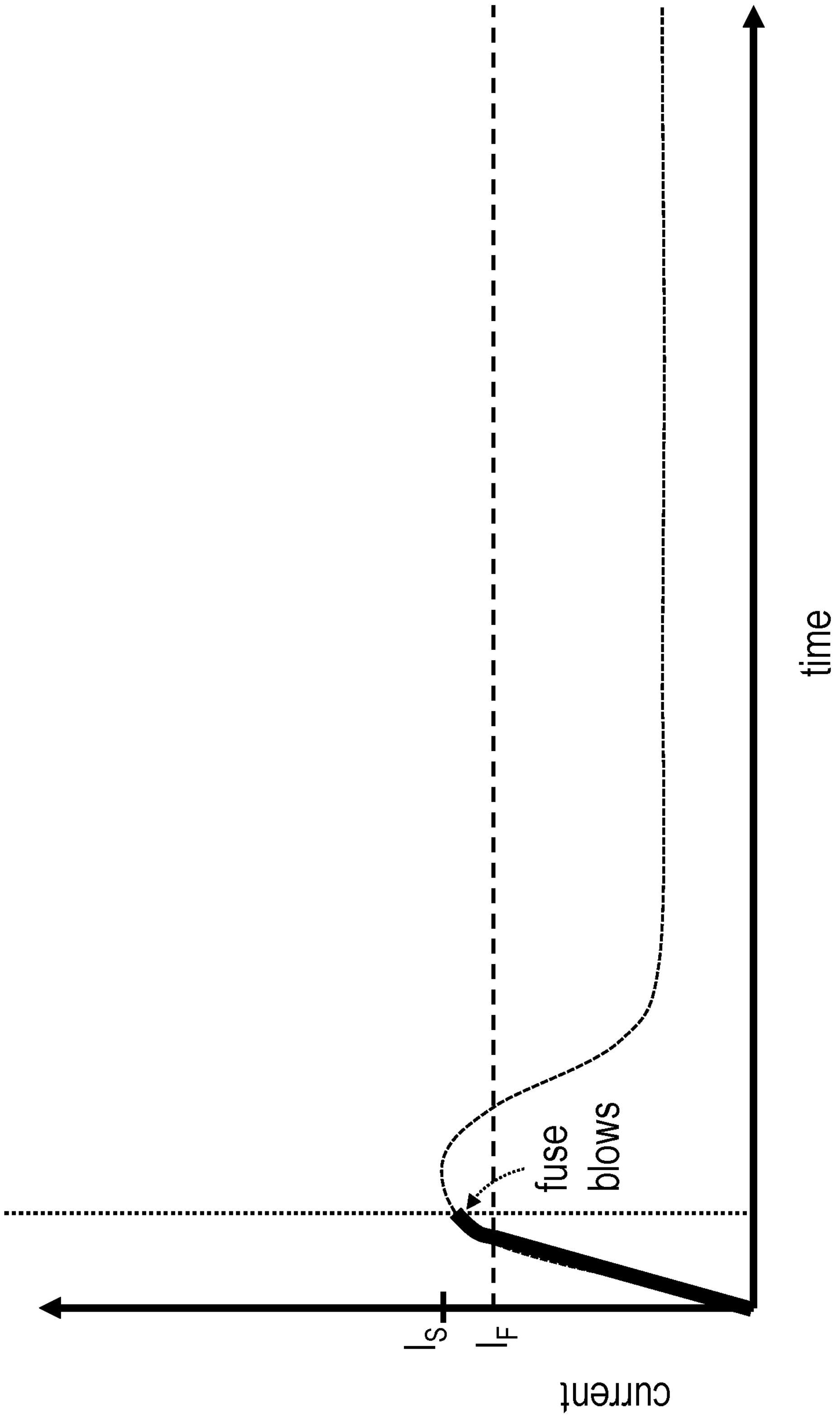
FIG. 1A shows a plot of a surge current as a function of time, shown relative to a threshold current rating of a fuse.

Where used in the various figures of the drawings, the same reference numerals designate the same or similar parts. Furthermore, when the terms "front," "back," "first," "second," "upper," "lower," "height," "top," "bottom," "outer," "inner," "width," "length," "end," "side," "horizontal," "vertical," and similar terms are used herein, it should be understood that these terms have reference only to the structure shown in the drawing and are utilized only to facilitate describing the subject of this disclosure.

All figures are drawn for ease of explanation of the basic teachings of the present technology only; the extensions of the figures with respect to number, position, relationship, and dimensions of the parts to form various embodiments will either be explained or will be within the skill of persons of ordinary skill in the art after the following teachings of the present disclosure have been read and understood. Further, the exact dimensions and dimensional proportions to conform to specific width, length, and similar requirements will likewise be within the skill of the art after the following teachings of the present disclosure have been read and understood.

DETAILED DESCRIPTION OF THE PREFERRED EMBODIMENT

Thermally actuated overcurrent circuit breakers are used in many applications due to their relatively low cost, lack of sensitivity to position and other environmental factors, and delayed-trip characteristics. The delayed-trip characteristics of thermally actuated overcurrent circuit breakers are, for example, useful to prevent nuisance tripping during motor startup surges.

FIG. 1A shows a plot of a surge current as a function of time, shown relative to a threshold current rating of a fuse. The surge current would, in the absence of an overcurrent protection device having a threshold current rating $I_F$, briefly exceed the threshold current rating of an overcurrent protection device, as shown by the dotted portion of the surge current plot. However, the surge current would quickly have dropped to a lower level, well below the threshold current rating $I_F$. In the case where the overcurrent protection device comprises a fuse, the fuse will be blown shortly after the surge current exceeds the threshold current rating $I_F$ of the fuse, necessitating replacement of the fuse.

In many instances, however, a circuit may not require protection from a transient surge current which does not significantly exceed a threshold current rating for a significant period of time. In some instances, such as when the circuit is located in a remote area such as in a marine vehicle, or in a remote location, replacement fuses may be in limited supply, and replacement of fuses after exposure to surge currents which would not damage the circuit may be particularly problematic.

Figure 1B:
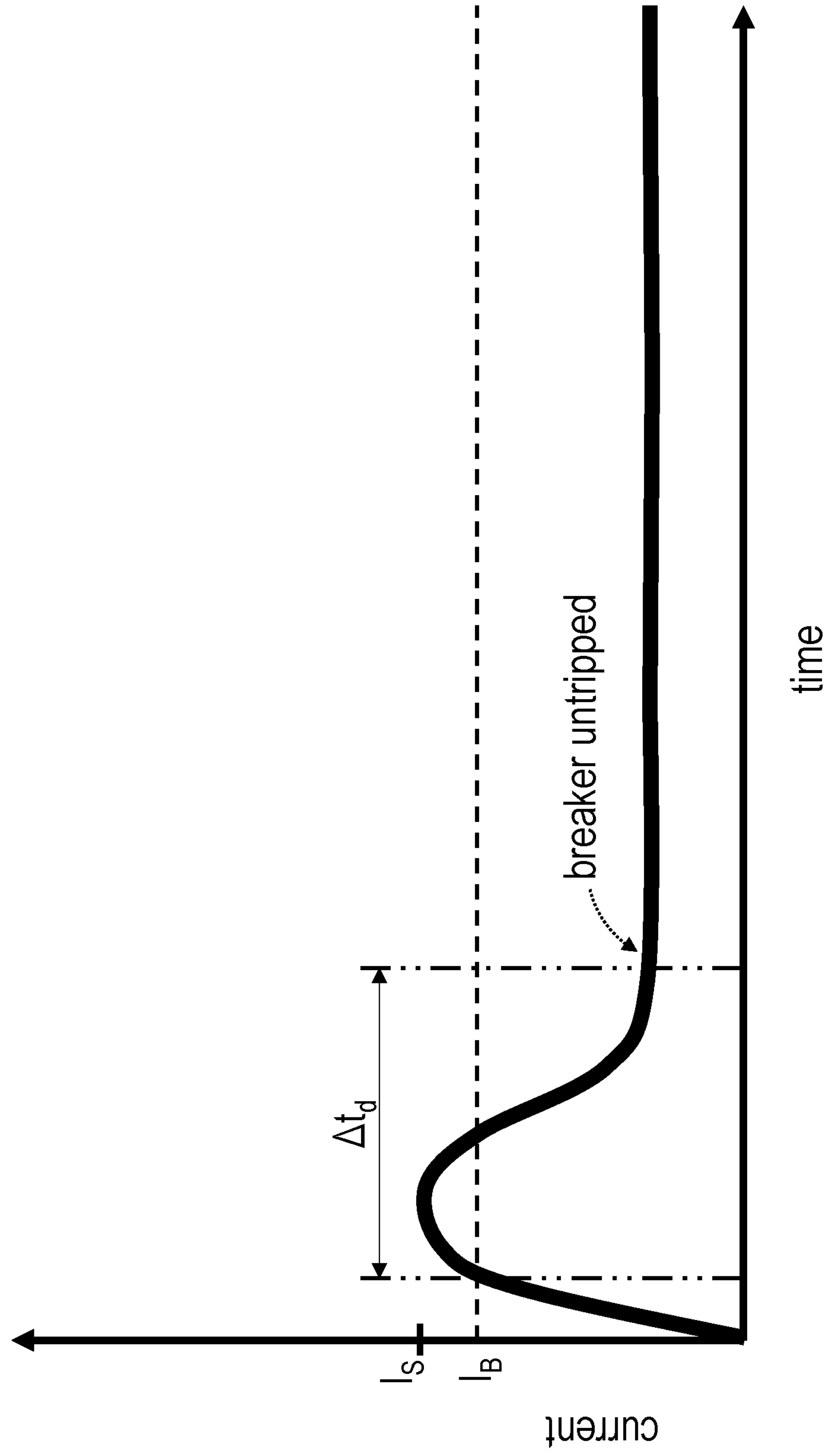
FIG. 1B shows a plot of the surge current shown in FIG. 1A, shown relative to a threshold current rating of a thermally activated circuit breaker.

FIG. 1B shows a plot of the surge current shown in FIG. 1A, shown relative to a threshold current rating of a thermally activated circuit breaker. The surge current has a peak current $I_S$ which briefly exceeds the threshold current rating $I_B$ of a thermally activated overcurrent protection device. However, in contrast to an overcurrent protection device such as a fuse, the thermally activated overcurrent protection device requires exposure to a current exceeding its threshold current rating $I_B$ for a delay period $\Delta t_d$ before a thermally activated component of the thermally activated circuit breaker is sufficiently heated to change shape and break the circuit, tripping the breaker. While the peak current $I_s$ of the surge current exceeds the threshold current rating $I_B$ of the thermally activated circuit breaker, it drops back below the threshold current rating $I_B$ before expiration of the delay period $\Delta t_d$ of the thermally activated circuit breaker. The thermally activated circuit breaker is not tripped by this brief surge, and neither the thermally activated circuit breaker nor the protected electronic components are damaged by this brief surge.

The delay period of the breaker may not be a fixed period of time in all situations, but may in some embodiments vary due to a variety of factors, such as the temperature of the thermally activated component prior to exposure of the thermally activated circuit breaker to a current above the threshold current rating, and the magnitude of the overload current. In some embodiments, however, exposure to an overload current sufficiently higher than the threshold current rating of the breaker may expose both the circuit breaker and/or the components to be protected by the circuit breaker to an overload current of sufficient magnitude and/or duration to cause damage. Due to their delayed-trip characteristics, some thermally activated circuit breakers may become expensive fuses when subjected to extreme overloads, such as may occur during some short circuit conditions.

Figure 1C:
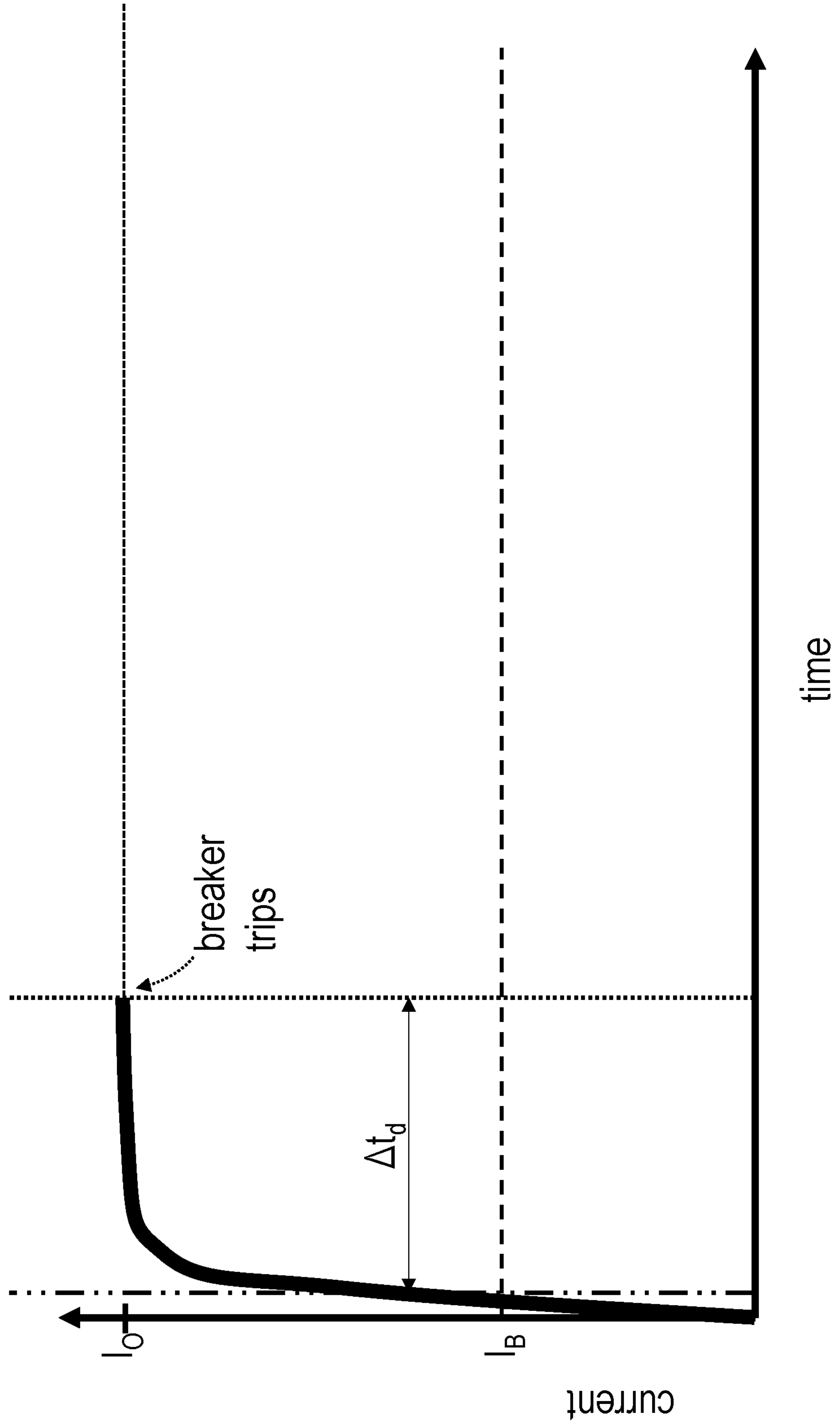
FIG. 1C shows a plot of an overload current as a function of time, shown relative to a threshold current rating of a fuse.

FIG. 1C shows a plot of an overload current as a function of time, shown relative to a threshold current rating of a fuse. In contrast to the current of FIG. 1A and FIG. 1B, the overload current of FIG. 1C reaches a peak overload current $I_O$ well above the threshold current rating $I_B$ of the thermally activated circuit breaker. Because of the delay period $\Delta t_d$ of the thermally activated circuit breaker, the thermally actuated circuit breaker, and the components protected using the thermally actuated circuit breaker, may be exposed to the peak overload current $I_O$ for much or all of the delay period $\Delta t_d$. This can result in significant damage to the thermally activated circuit breaker, rendering it inoperable, as well as to any components protected by the thermally activated circuit breaker. Because an inoperable thermally activated circuit breaker cannot be reset and used again, the entire thermally activated circuit breaker must be replaced.

Figure 1D:
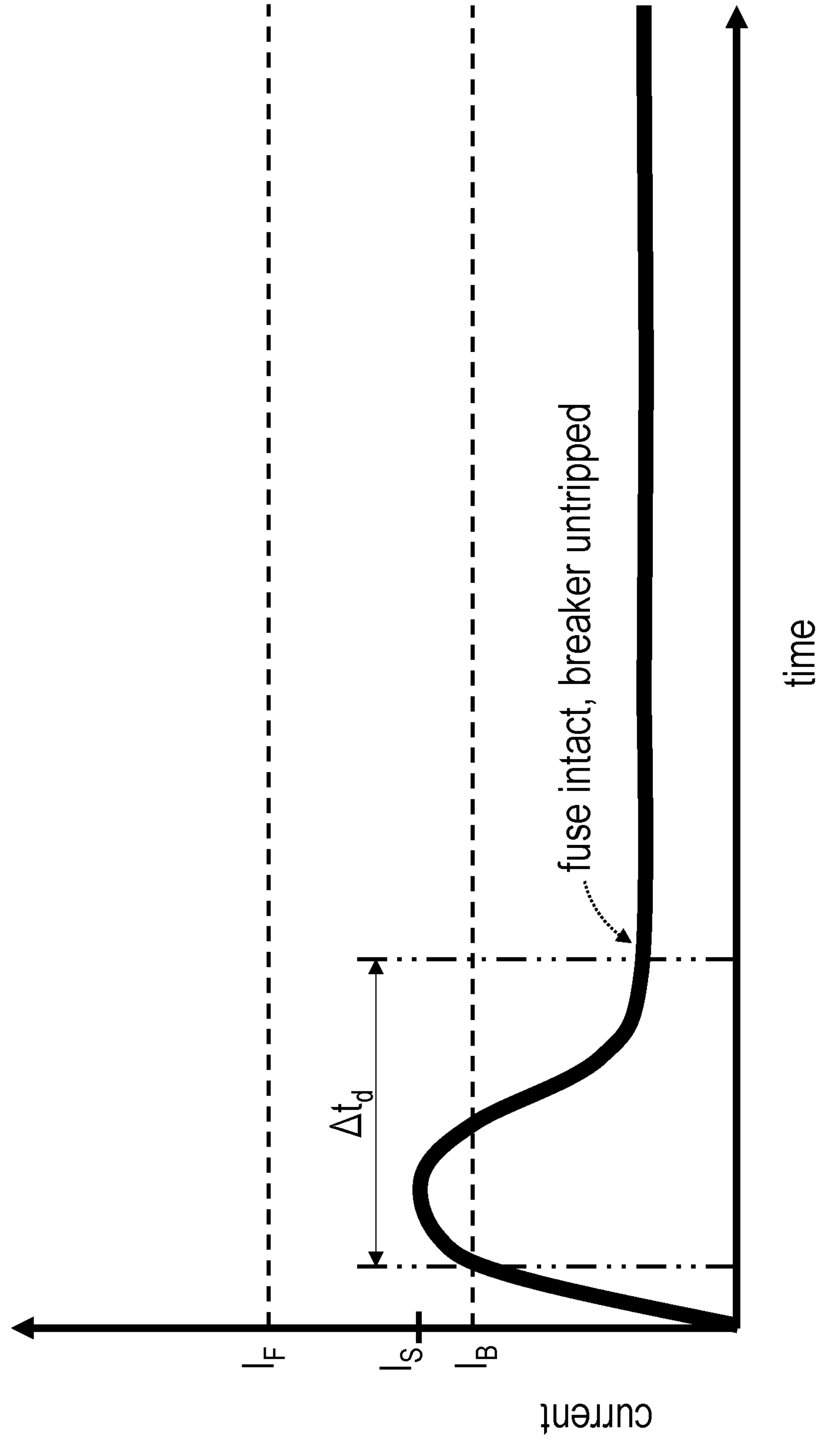
FIG. 1D shows a plot of the surge current shown in FIG. 1A, shown relative to the threshold current ratings of a fuse and a thermally activated circuit breaker in series with one another.

One remedy to this problem is to add a higher-rated, but faster-acting, fuse in series with a lower-rated circuit breaker. This allows the resettable circuit breaker to protect the application circuit from most overloads, while relying on the fuse to protect both the circuit breaker and the application circuit from extremely high overloads, such as those experienced as a result of short circuits. FIG. 1D shows a plot of the surge current shown in FIG. 1A, shown relative to the threshold current ratings of a fuse and a thermally activated circuit breaker in series with one another. As can be seen in FIG. 1D, the threshold current rating $I_F$ of the fuse is higher than the threshold current rating $I_B$ of the thermally activated overcurrent protection device. In response to a surge current with a peak value $I_S$ which does not exceed the threshold current rating $I_F$ of the fuse, and does not exceed the threshold current rating $I_B$ of the thermally activated overcurrent protection device for a period of time greater than the delay period $\Delta t_d$ of the thermally activated circuit breaker, the fuse will not be blown, and the thermally activated circuit breaker will not be tripped.

Figure 1E:
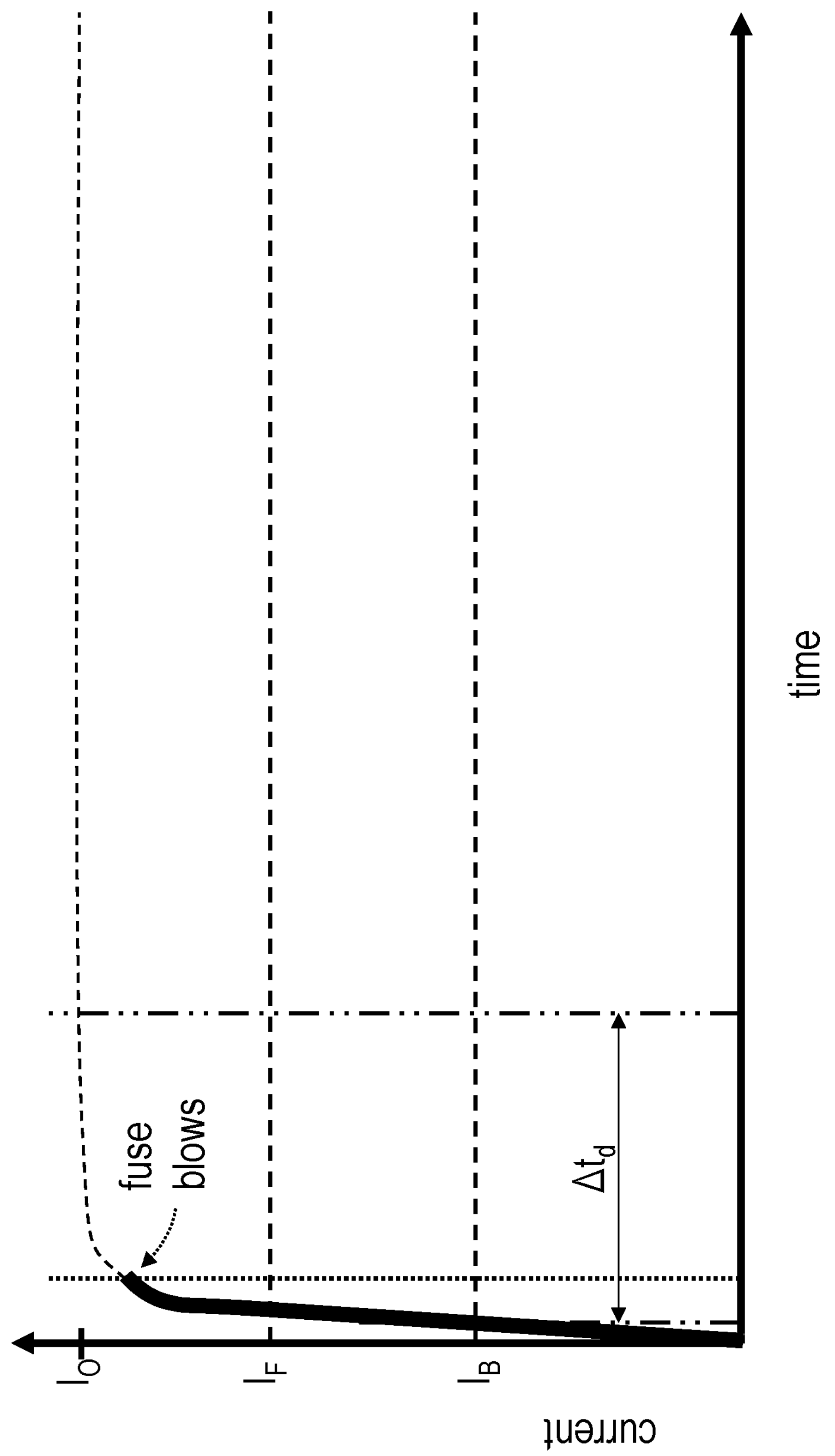
FIG. 1E shows a plot of the overload current shown in FIG. 1C, shown relative to the threshold current ratings of a fuse and a thermally activated circuit breaker in series with one another.

The combination of a higher-rated, faster-acting fuse and a lower-rated, slower-acting thermally activated circuit breaker also provides protection against high overload currents. FIG. 1E shows a plot of the overload current shown in FIG. 1C, shown relative to the threshold current ratings of a fuse and a thermally activated circuit breaker in series with one another. As can be seen in FIG. 1E, the fust blows shortly after the overload current passes the threshold current rating $I_F$ of the fuse, well before expiration of the delay period $\Delta t_d$ of the thermally activated circuit breaker. The thermally activated circuit breaker is thus exposed to the overload circuit for only a brief period of time relative to its delay period $\Delta t_d$, preventing or minimizing damage to the thermally activated circuit breaker.

The use of a higher-rated fuse in series with a lower-rated thermally activated circuit breaker can provide a desired level of protection from overload circuits while avoiding nuisance tripping due to brief surges and minimizing the need for replacement parts due to blown fuses or circuit breakers rendered inoperable. However, providing a separate fuse in addition to the fuse holder and wiring used to retain and connect the fuse may not be practical in all embodiments. Frequently, there may be a lack of application panel space to mount the fuse holder and additional wires.

In some embodiments, a circuit breaker having an internal fuse link may be used, such that the fuse link serves as a fail-safe to open the circuit in the event of an extreme current event. This may provide protection against nuisance tripping due to surge currents such s the surge current illustrated in FIG. 1A. However, in the event of an overload current such as that illustrated in FIG. 1C, the damaged internal fuse link will have rendered the entire circuit breaker inoperable. While replacement is only after exposure to an overload current beyond the threshold rating of the internal fuse link, the replacement of the entire circuit breaker can be expensive, and replacement can be difficult in remote locations without ready access to replacement parts.

In other embodiments, a circuit breaker may include an integrated replaceable fuse, which can be used to provide a faster-acting overcurrent protection device having a higher rating than the circuit breaker itself. Because the integrated fuse in such an embodiment is replaceable by a user when the fuse is blown, the functionality of the circuit breaker can be restored without the need to replace the entire circuit breaker.

Figure 2A:
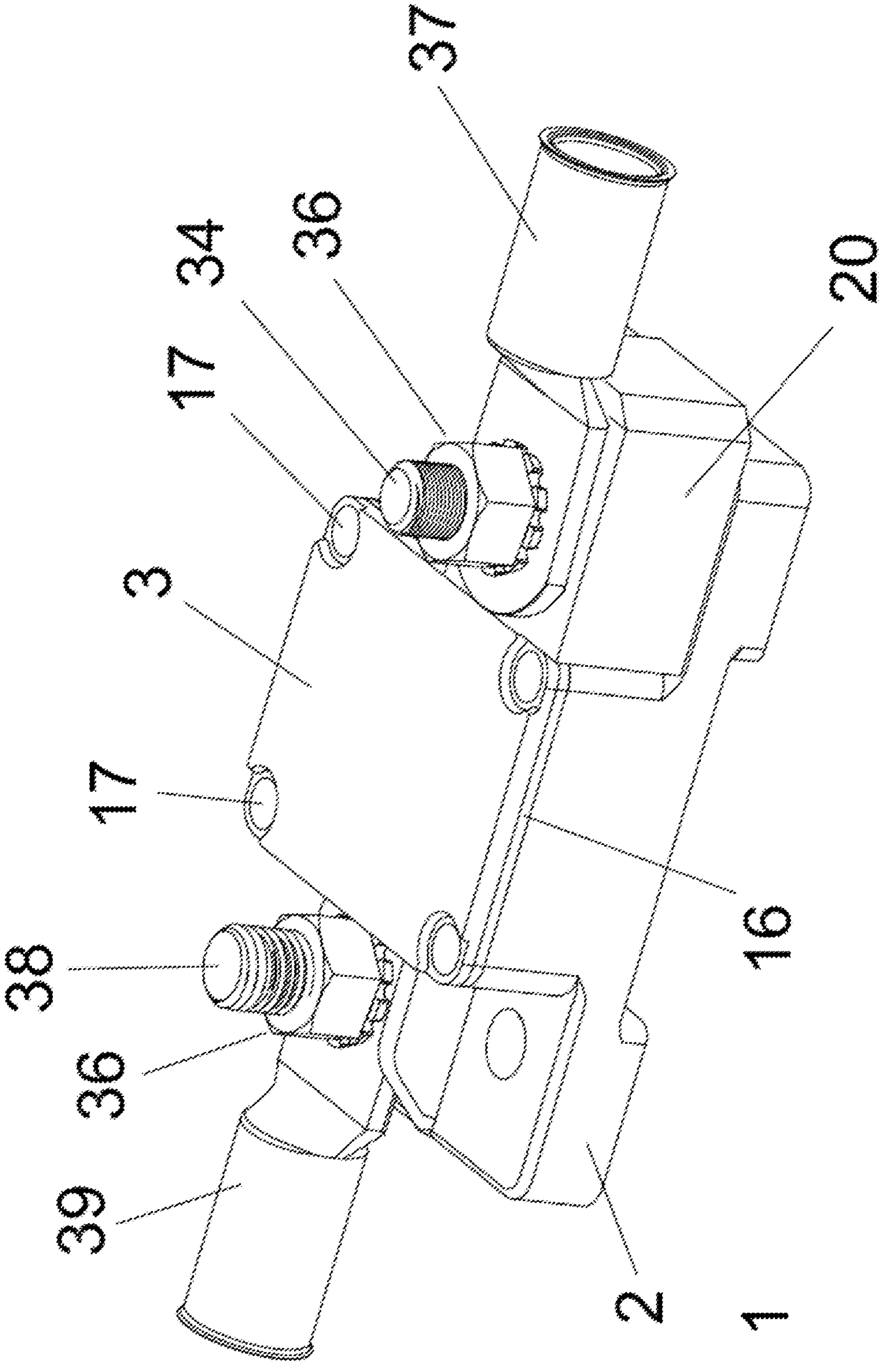
FIG. 2A is a top perspective view of an embodiment of a circuit breaker with an integrated removable fuse.
Figure 2B:
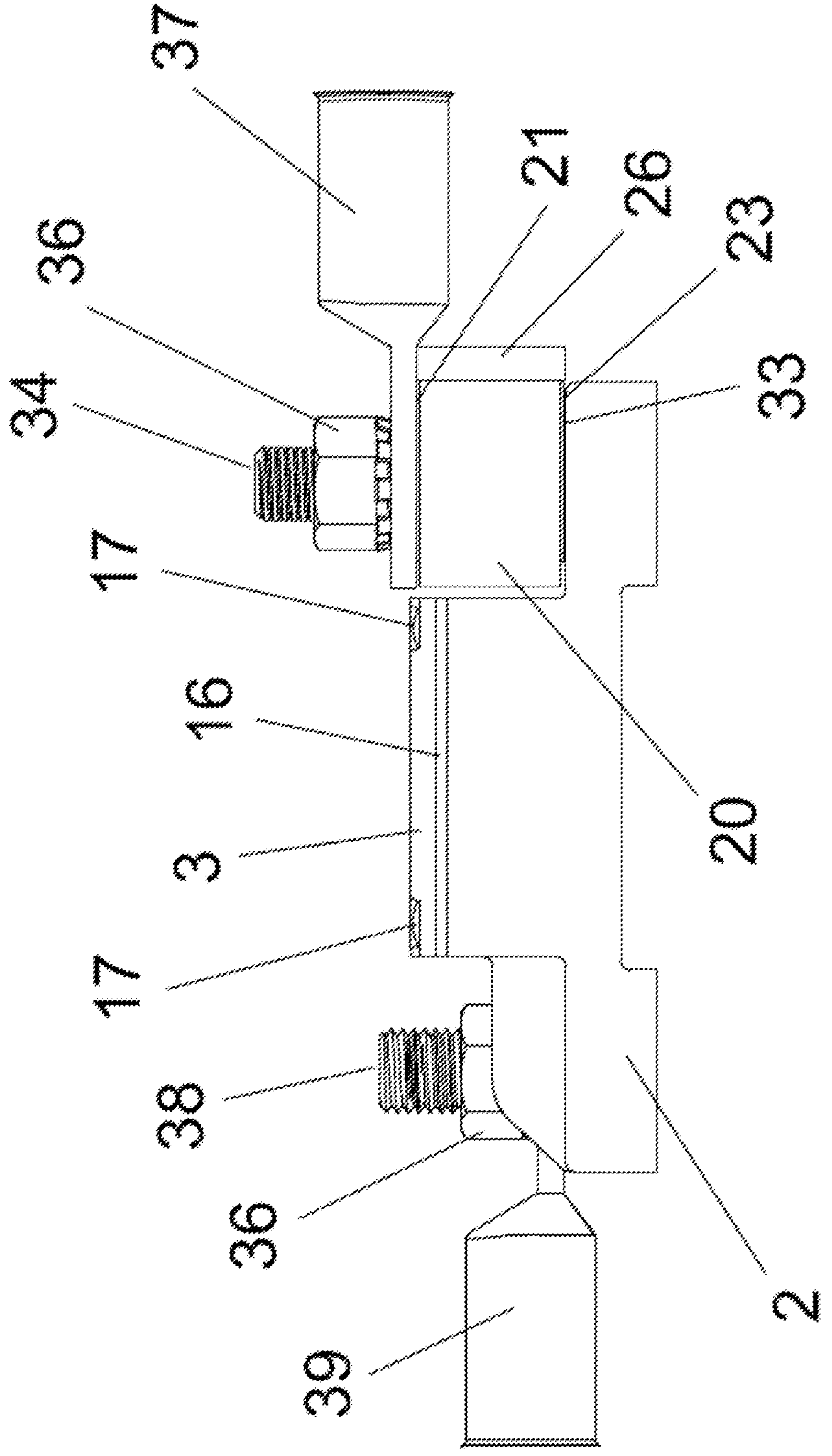
FIG. 2B is a front view of the circuit breaker device of FIG. 2A.

FIG. 2A is a top perspective view of an embodiment of a circuit breaker with an integrated removable fuse. FIG. 2B is a front view of the circuit breaker device of FIG. 2A. In the illustrated embodiment, the integrated removable fuse 20 can be located on a line side or on a load side of the circuit breaker device 1.

A cover 3 is located within a central region of the circuit breaker device 1, between the first threaded terminal stud 34 and the second threaded terminal stud 38. In the illustrated embodiment, the first threaded terminal stud may also be referred to as the line side threaded fuse terminal stud 34. As discussed below, however, in other embodiments the integrated removable fuse may be located on the load side of the device, such that the second threaded terminal stud 38 would serve as the threaded fuse terminal stud.

The cover 3 is held in place by a plurality of rivets 17. A gasket 16 is held in place beneath the breaker, to protect against, for example, water or other fluid ingress underneath the cover 3. In the illustrated embodiment, the cover 3 is substantially flat, although in other embodiments, other cover shapes may be used. For example, in some embodiments, the portion of the cover 3 adjacent the gasket 16 may comprise a shape configured to assist in retention of the gasket 16, such as a shape complementary to the shape of the adjacent portion of the gasket 16.

As can be seen in FIG. 2A, the base 2 has at least one internal compartment 4 having an open end 5, as well as a cover 3 which in the illustrated embodiment is generally flat. The cover 3 encloses the open end 5 of the base 2. Rivets 17 may be used to anchor the cover 3 and a gasket 16 to the base 2.

In the embodiment of FIG. 2A, application wire terminations 37 and 39 are shown on each of the first threaded terminal stud 34 and the second threaded terminal stud 38, respectively. These application wire terminations 37 and 39 are held in place on their respective threaded terminal studs by terminal nuts 36. These application wire terminations 37 and 39 are included in FIG. 2A as non-limiting, illustrative examples of connections that can be made between the circuit breaker device 1 and the remainder of an application circuit.

The particular embodiment of circuit breaker device 1 illustrated in FIG. 2A is an automatically resetting thermal overcurrent circuit breaker. However, other embodiments of the disclosed technology include a wide variety of other circuit breaker devices, such as push-to-reset circuit breakers and switchable circuit breakers.

The base 2 of the circuit breaker device in the illustrated embodiment is a cup-shaped base which can have a square U-shaped profile, with a recessed portion in a central region of the base 2. The overall shape of the base 2 may vary in other embodiments, as well as the shape and dimensions of particular sections or regions of the base 2. In some embodiments, the base 2 may comprise an electrically insulating material, and in some particular embodiments, the entire base 2 may be formed from one or more electrically isolating materials.

Figure 2C:
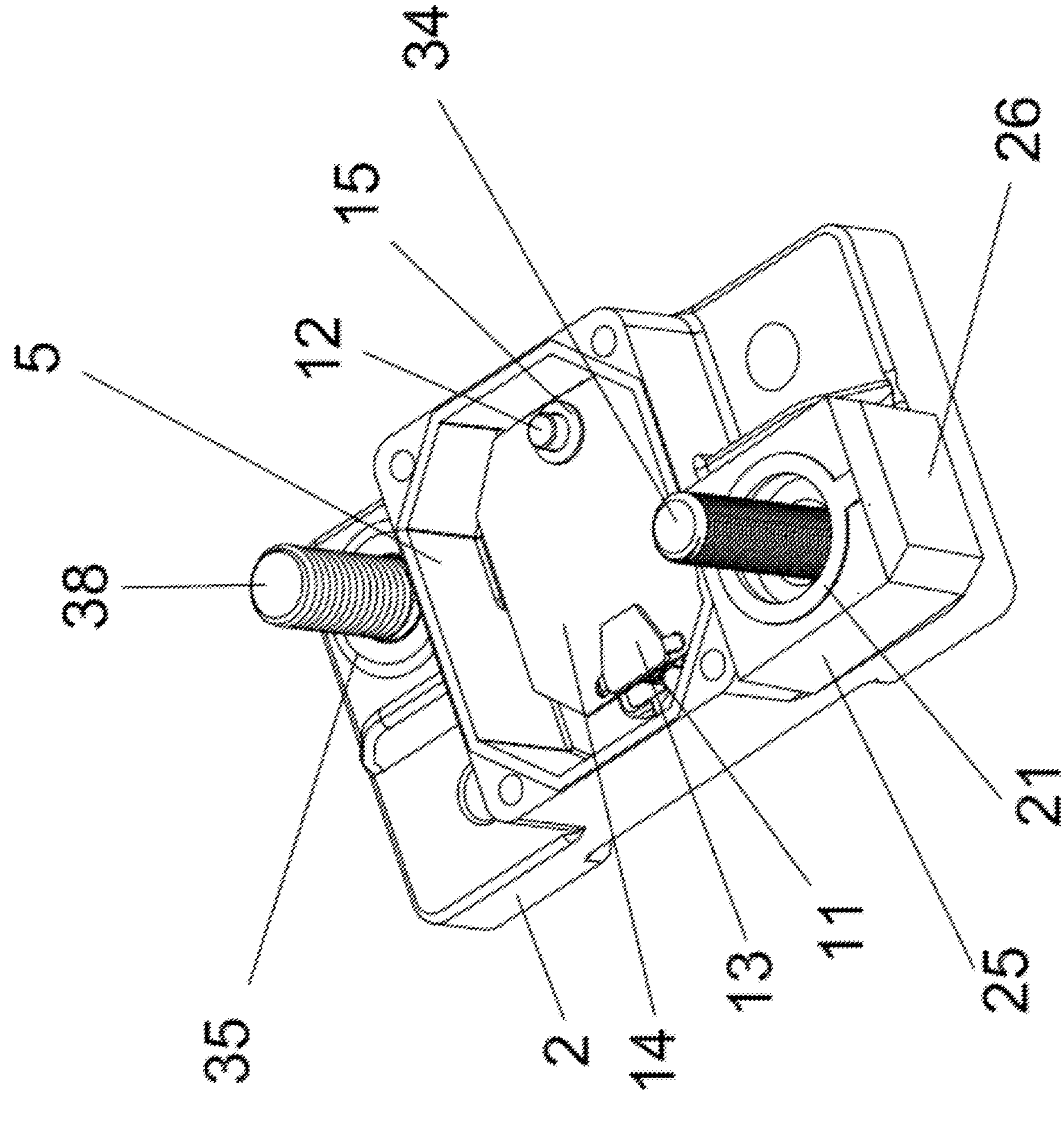
FIG. 2C is a top perspective view of the circuit breaker of FIG. 2A, shown with the cover and gasket removed to expose components within the internal compartment covered by the gasket.

FIG. 2C is a top perspective view of the circuit breaker of FIG. 2A, shown with the cover and gasket removed to expose components within the internal compartment covered by the gasket. In addition, the terminal nuts 36 and the application wire terminations 37 and 39 have been removed in FIG. 2B, so that the top of the integrated removable fuse 20 can be seen.

The device 1 also includes an overcurrent protection element 14, which in the illustrated embodiment is a bimetallic current-sensing element. In the illustrated embodiment, a single thermal element post 12 pierces one end of the overcurrent protection element 14, but other suitable support configurations may be used in other embodiments. The overcurrent protection element 14 is held in position against an underlying electrical contact point 8 (se FIG. 2D) by a staking washer 15 pressed over the thermal element post 12. A weld plate 13 and a moveable electrical contact 11 are attached to the opposite end of the overcurrent protection element 14.

Figure 2D:
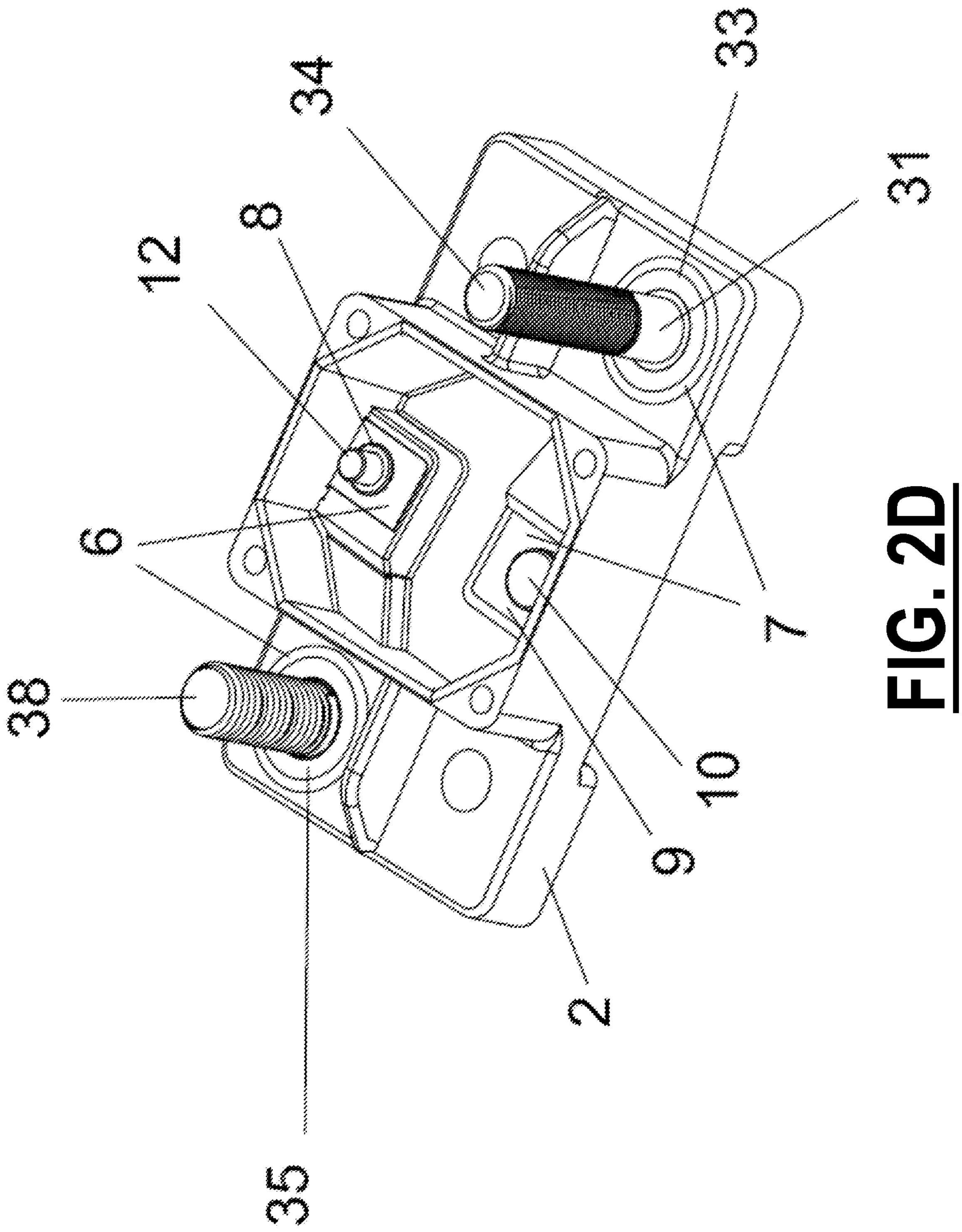
FIG. 2D is another top perspective view of the circuit breaker of FIG. 2B, shown with certain components within the internal compartment removed.

FIG. 2D is another top perspective view of the circuit breaker of FIG. 2B, shown with certain components within the internal compartment removed. In addition, the integrated removable fuse 20 has been removed to show more of the threaded fuse terminal stud 34, as well as fuse stud insulation 31 and the terminal pad 33.

Electrically conducting terminals 6 and 7 extend through the base 2, from points outside the internal compartment 5 adjacent one of the threaded posts to points within the internal compartment 5. Electrically conducting terminal 6 extends between the second threaded post 38 and the electrical contact point 8, which includes or is in electrical communication with thermal element post 12. Electrically conducting terminal 7 extends between the first threaded post 34 and the electrical contact point 9, which includes or is in electrical communication with stationary electrical contact 10.

Electrical conducting terminal 6 is pierced by the threaded terminal stud 38 on the externally available end of electrical conducting terminal 6, and electrically connected to the threaded terminal stud 38. When device 1 is installed in an application circuit, the application wire termination 39 is installed such that the application wire termination 39 is pierced by threaded terminal stud 38 and held in electrical contact against terminal pad 35 of terminal 6 by terminal nut 36 threaded onto terminal stud 38.

Figure 3A:
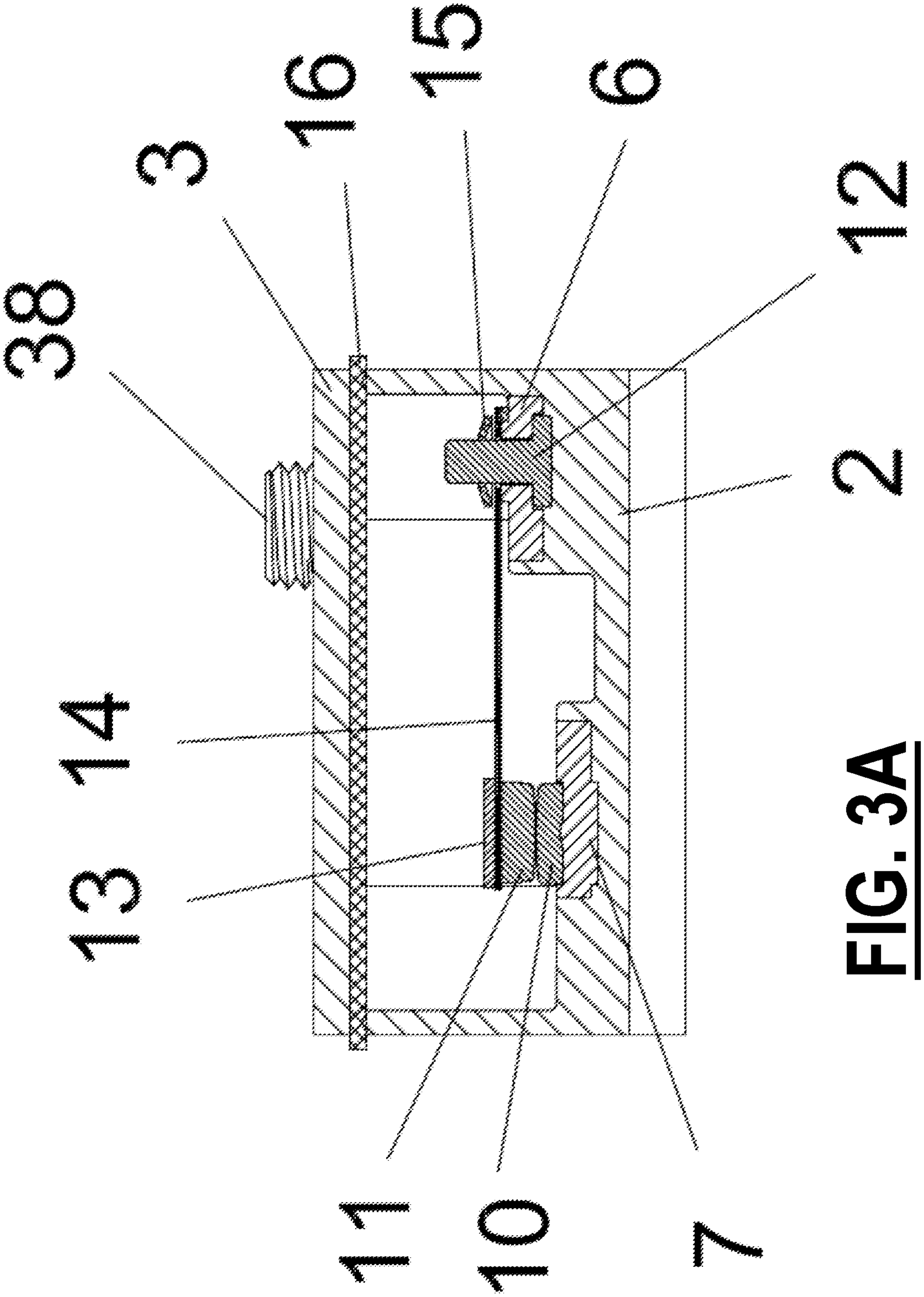
FIG. 3A is a side cross-sectional view of the circuit breaker device of FIG. 2A, taken along a plane generally orthogonal to the front face of the circuit breaker, with the thermally activated overcurrent protection element shown in an untripped, or closed, position.
Figure 3B:
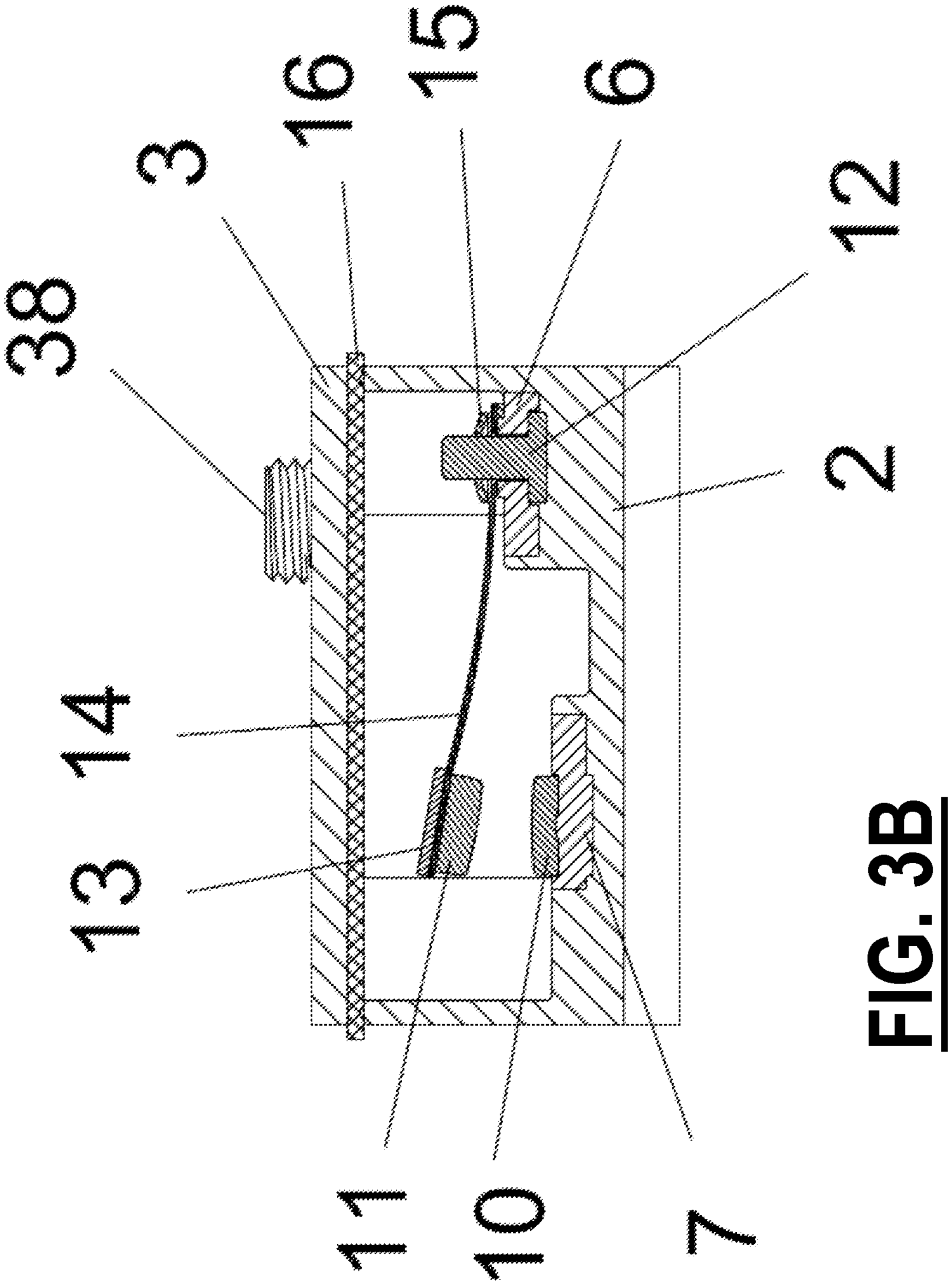
FIG. 3B is another side cross-sectional view of the circuit breaker device of FIG. 2A, taken along the same plane as FIG. 3A, with the thermally activated overcurrent protection element shown in a tripped, or open, position.

FIG. 3A is a side cross-sectional view of the circuit breaker device of FIG. 2A, taken along a plane generally orthogonal to the front face of the circuit breaker, with the thermally activated overcurrent protection element shown in an untripped, or closed, position. FIG. 3B is another side cross-sectional view of the circuit breaker device of FIG. 2A, taken along the same plane as FIG. 3A, with the thermally activated overcurrent protection element shown in a tripped, or open, position.

The thermally activated overcurrent protection element 14 is formed such that it will flex and change shape in response to Joule heating generated by electrical current greater than specified limit flowing through the overcurrent protection element 14. In particular, the overcurrent protection element 14 will rapidly change shape and snap over center, with the radially outward portions of the overcurrent protection element 14 supporting a weld plate 13 and moveable electrical contact 11 flexing away from a stationary electrical contact 10. This breaks the electrical connection between the moveable electrical contact 11 and the stationary electrical contact 10.

When the overcurrent protection element 14 is not flexed in response to Joule heating generated by electrical current flowing through the overcurrent protection element 14, the overcurrent protection element 14 may be in a first position in which the movable electrical contact 11 of the overcurrent protection element 14 is in contact with the stationary electrical contact 10 of the device 1, as illustrated in FIG. 3A. In this first position, the overcurrent protection element 14 provides circuit continuity between electrically conducting terminals 6 and 7 of the device 1.

In the particular illustrated embodiment of the side cross section view of FIG. 3A, the overcurrent protection element 14 is in a generally planar configuration when in the first position. However, the shape of the thermally actuated overcurrent protection element 14 in other embodiments of circuit breaker devices need not be a planar shape. For example, in other embodiments, the first position may involve some curvature of the overcurrent protection element 14.

FIG. 3B illustrates the device 1 with the overcurrent protection element 14 shown in the tripped position. When electrical current above a specified limit flows through the overcurrent protection element 14, the overcurrent protection element 14 responds to the Joule heating by rapidly changing shape to a second position in which the moveable electrical contact 11 of the overcurrent protection element 14 is spaced apart from and no longer in contact with the stationary electrical contact 10 of the device 1. The overcurrent protection element 14 therefore automatically separates the facing stationary electrical contact 10 and movable electrical contact 11 from one another in response to sufficient Joule heating, breaking the flow of current through the device 1.

Once the overcurrent protection element 14 has sufficiently cooled from the Joule heating which tripped the overcurrent protection element 14 to the second position, the overcurrent protection element 14 will immediately flex back to the first position shown in FIG. 3A.

In other embodiments of circuit breaker devices not specifically illustrated herein, the overcurrent protection element 14 is formed to remain in the tripped second position even after cooling from the Joule heating, until a manual push-to-reset mechanism activated to manually reset the overcurrent protection element 14 from the open second position to the closed first position once the overcurrent protection element 14 has sufficiently cooled from the Joule heating created by the overcurrent condition. Premature actuation of the manual push-to-reset mechanism prior to sufficient cooling of the overcurrent protection element 14 will result in immediate flexure of the overcurrent protection element 14 back to the open second position.

In still other embodiments of circuit breaker devices not specifically illustrated herein, a switching mechanism is provided to manually flex open the overcurrent protection element 14 from the closed first position to the open second position.

As discussed above, the flexure of the thermally activated overcurrent protection element 14 to the second position may in some embodiments be rapid once the overcurrent protection element has been heated above a particular temperature due to Joule heating. Similarly, the flexure of the thermally activated overcurrent protection element 14 back to the first position once the overcurrent protection element 14 cools below a particular temperature due to the absence of current through the overcurrent protection element 14 is also rapid. However, the heating and cooling of the thermally activated overcurrent protection element 14 introduce some delay before the overcurrent protection element 14 flexes to the second position. While this may be desirable in many implementations, the use of a thermally activated overcurrent protection element 14 as the sole overcurrent protection element in an application circuit can render both the thermally activated overcurrent protection element 14 and the remainder of the application circuit vulnerable to overload currents, as discussed above.

To minimize this risk, the integrated replaceable fuse 20 can be a faster-acting overcurrent protection device, with a higher rating than the thermally activated overcurrent protection element 14.

Figure 4B:
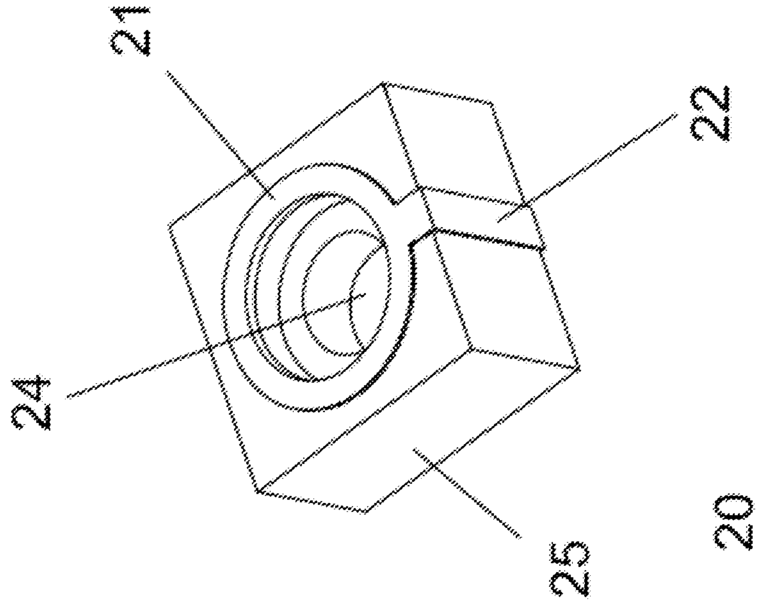
FIG. 4B is another top perspective view of FIG. 4A, with the fuse cover removed.
Figure 4A:
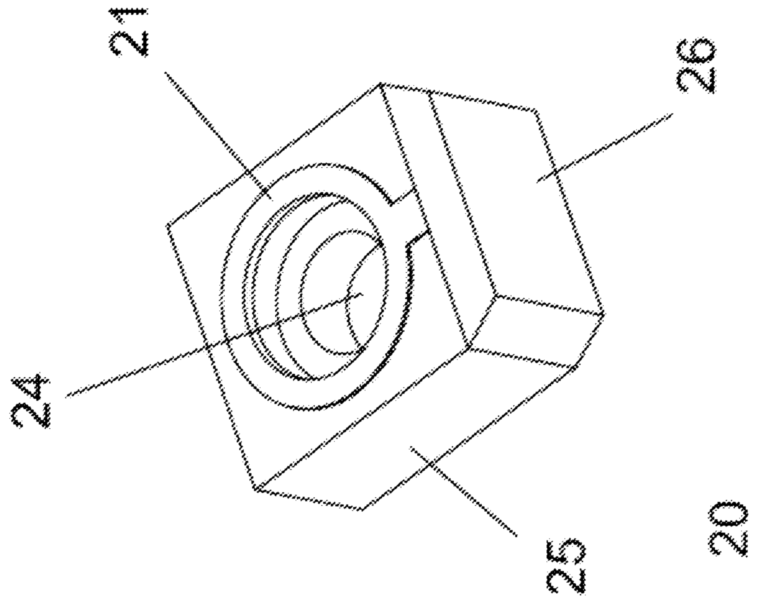
FIG. 4A is a top perspective view of an embodiment of an integrated replaceable fuse, such as the integrated replaceable fuse of the circuit breaker device of FIG. 2A.
Figure 4C:
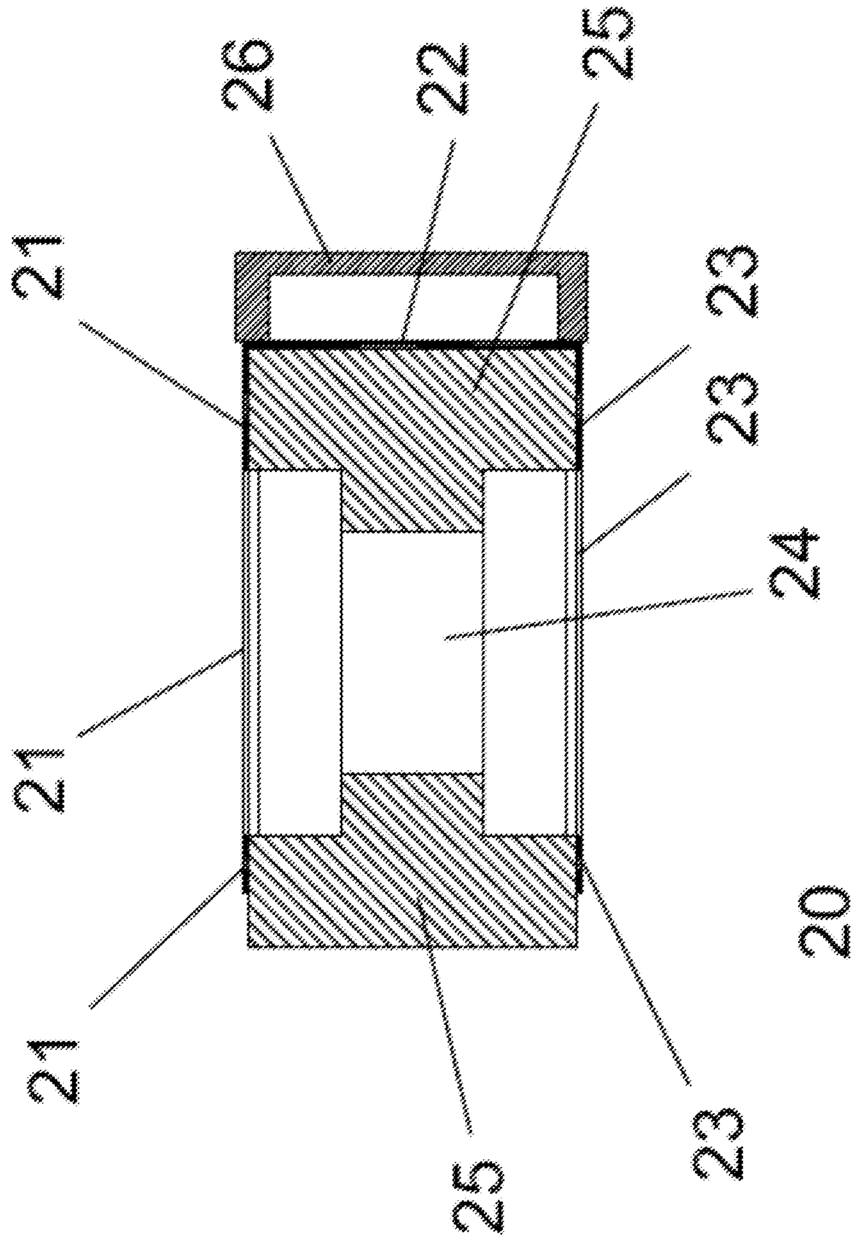
FIG. 4C is a side cross-sectional view of the integrated replaceable fuse of FIG. 4C, shown with the fuse cover in place.

FIG. 4A is a top perspective view of an embodiment of an integrated replaceable fuse, such as the integrated replaceable fuse of the circuit breaker device of FIG. 2A. FIG. 4B is another top perspective view of FIG. 4A, with the fuse cover removed. FIG. 4C is a side cross-sectional view of the integrated replaceable fuse of FIG. 4C, shown with the fuse cover in place.

In the illustrated embodiment, the integrated replaceable fuse 20 comprises a removeable cube-type fuse, although other suitable shapes and types of replaceable fuses may be used in other embodiments. The integrated replaceable fuse 20 comprises a fuse body 25 comprising an electrically insulating material, and the fuse cover 26 similarly comprises an electrically insulating material.

An upper fuse electrical contact point 21 disposed on the upper surface of the fuse body 25 is in electrical communication with a lower fuse electrical contact point 23 located on the lower surface of the fuse body 25 only via the fuse element 22 running along a side face of the fuse body between the upper and lower surfaces of the fuse body 25. The fuse element 22 is protected by the overlying fuse cover 26.

In the illustrated embodiment, the upper electrical contact point 21 comprises a ring portion extending around the periphery of the fuse center aperture 24 extending between the upper and lower surfaces of the fuse body 25. Similarly, the lower electrical contact point 23 comprises a ring portion extending around the periphery of the fuse center aperture 24 extending between the upper and lower surfaces of the fuse body 25. A radially extending section connects these ring portions to the adjacent portions of the fuse element 22.

FIGS. 4A to 4C illustrate one particular shape and configuration of the integrated replaceable fuse 20 and the components thereof, but a wide variety of other shapes and designs of replaceable fuses can be used in other embodiments.

Integrated replaceable fuse 20 is electrically rated to carry current without fusing open while the current remains below a specified fusing limit, typically greater than the specified limit at which the circuit breaker of device 1 would trip and open the circuit. At currents greater than the specified fusing limit, the fuse element 22 of the integrated replaceable fuse 20 would fuse open, no longer conducting current due to melting apart of the fuse element 22 induced by Joule heating, and open the circuit.

Figure 5:
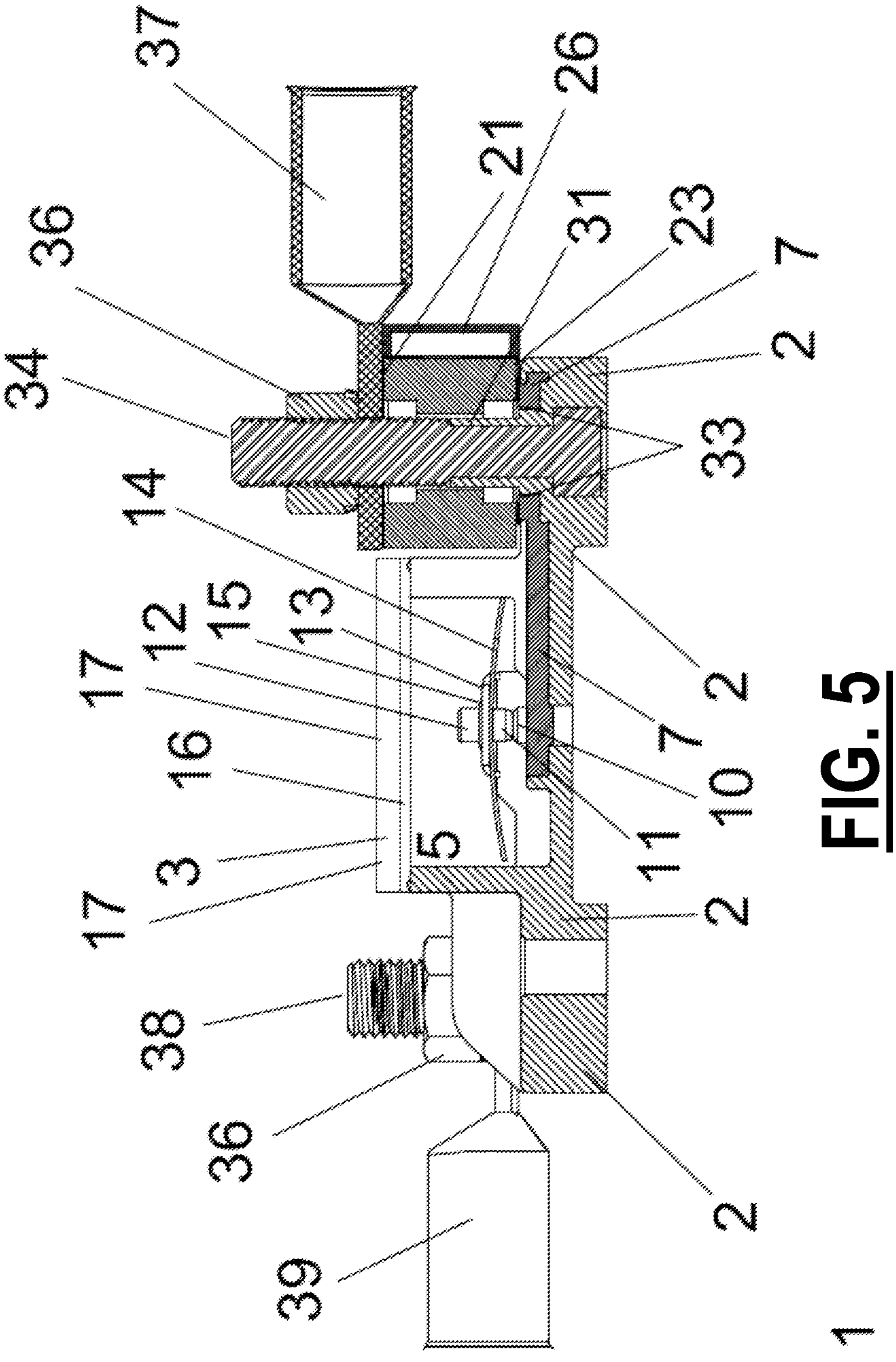
FIG. 5 is a front cross-sectional view of the circuit breaker device of FIG. 2A, taken along a plane generally parallel to the front face of the circuit breaker.

FIG. 5 is a front cross-sectional view of the circuit breaker device of FIG. 2A, taken along a plane generally parallel to the front face of the circuit breaker. As can be seen in FIG. 5, the internal structure of the circuit breaker 1 adjacent the first threaded stud 34 which serves as the threaded fuse terminal stud is different from the internal structure of the circuit breaker 1 adjacent the second threaded stud 38.

In particular, the threaded fuse terminal stud 34 extends through the externally available end of the electrically conducting terminal 7, but is not directly electrically connected to the threaded fuse terminal stud 34. The externally available end of the electrically conducting terminal 7 comprises an oversized aperture having a cross-sectional size larger than the cross-sectional size of the threaded fuse terminal stud 34, so that the threaded fuse terminal stud 34 can pass through the aperture of the externally available end of the electrically conducting terminal 7 without contacting the edges of the aperture in the electrically conducting terminal 7. A layer of insulating material 31 circumferentially coats the threaded fuse terminal stud 34 where the threaded fuse terminal stud 34 passes through the aperture in the electrically conducting terminal 7, inhibiting direct electrical connection between the electrically conducting terminal 7 and the threaded fuse terminal stud 34. In the illustrated embodiment, the layer of insulating material 31 is integral with the base 2, while in other embodiments, the insulating material 31 may be separate from the base 2.

When the device 1 is installed in an application circuit, the integrated replaceable fuse 20 is installed with threaded fuse terminal stud 34 passing through the center aperture 24 of the fuse 20. The lower electrical contact point 23 of integrated replaceable fuse 20 is in direct contact with and electrically connected to terminal pad 33 of electrically conducting terminal 7. The application wire termination 37 is then installed such that the application's wire termination 37 is pierced by threaded fuse terminal stud 34 and maintained in electrical contact against the fuse top electrical contact point 21 by terminal nut 36 threaded onto threaded fuse terminal stud 34. Threaded fuse terminal stud 34 is embedded in base 2, and inhibited from rotating relative to base 2.

When device 1 is wired into a typical application circuit, in the reset closed or "ON" condition current passes from the line side application circuit wire termination 37 through the upper electrical fuse contact point 21, through the fuse element 22, through the lower electrical fuse contact point 23, into terminal pad 33 of electrically conducting terminal 7 and into the electrical contact point 9 of device 1. From the electrical contact point 9, current passes through stationary contact 10 into moveable contact 11, through overcurrent protection element 14 and through electrical contact point 8 into electrically conducting terminal 6. From the terminal pad 35 of electrically conducting terminal 6 current then passes to application wire termination 39.

In an embodiment in which the integrated replaceable fuse 20 has a higher rating than the thermally activated overcurrent protection element 14, certain surge currents which are lower than the threshold current rating of the integrated replaceable fuse 20 but higher than the threshold current rating of the overcurrent protection element 14 will not fuse open, and the fuse element 22 of the integrated replaceable fuse 20 will remain intact. Whether the overcurrent protection element 14 tripped and deformed to the second, open position is dependent on, among other factors, the duration of the surge current. If the overcurrent protection element 14 is tripped, the overcurrent protection element 14 will return to the first, open position either automatically or in response to an applied force, such as through the use of a push-to-reset button or switch. Upon resetting of the overcurrent protection element 14, the circuit breaker device 1 will be operational and fully functional.

In response to an overload current which exceeds the fusing limit of the integrated replaceable fuse 20, the integrated replaceable fuse 20 the fuse element 22 of the integrated replaceable fuse 20 will fuse open, and the circuit breaker device 1 will not be operational. However, once the conditions which created the overcurrent condition are resolved and the circuit is no longer energized, the removeable cube-type fuse 20 can be replaced by removing terminal nut 36 and application wire termination 37 from threaded fuse terminal stud 34, removing the spent integrated replaceable fuse 20 and replacing the spent with a new integrated replaceable fuse, and then reinstalling application wire termination 37 and retightening terminal nut 36 onto threaded fuse terminal stud 34. The circuit breaker device 1 can be restored to a fully operational state by replacement of a simple component, where replacement components can more readily available, and more easily stored in a remote application than entire replacement circuit breaker devices.

In addition, the compact size of the circuit breaker device allows integration of the circuit breaker device having an integrated replaceable fuse in applications which would not have sufficient clearance to permit the inclusion of a separate fuse and fuse holder in series with a circuit breaker.

While certain embodiments have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Certain terminology may be used in the following description for the purpose of reference only, and thus is not intended to be limiting. For example, terms such as "upper", "lower", "upward", "downward", "above", "below", "top", "bottom", "left", and similar terms refer to directions in the drawings to which reference is made. Such terminology may include the words specifically mentioned above, derivatives thereof, and words of similar import. Similarly, the terms "first", "second", and other such numerical terms referring to structures neither imply a sequence or order unless clearly indicated by the context.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "spherical" or "circular" or "cylindrical" or "semi-circular" or "semi-cylindrical" or any related or similar terms, are not required to conform strictly to the mathematical definitions of spheres, circles, cylinders or other structures, but can encompass structures that are reasonably close approximations.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees. As another example, in certain embodiments, as the context may permit, the term "generally perpendicular" can refer to something that departs from exactly perpendicular by less than or equal to 20 degrees.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although the invention has been disclosed in the context of certain embodiments and examples, it will be understood by those skilled in the art that this disclosure extends beyond the specifically disclosed embodiments to other alternative embodiments and/or uses of the embodiments and certain modifications and equivalents thereof. The scope of the present disclosure is not intended to be limited by the specific disclosures of preferred embodiments in this section or elsewhere in this specification, and may be defined by claims as presented in this section or elsewhere in this specification or as presented in the future.

What is claimed is:

1. A thermally activated overcurrent circuit breaker device, comprising:

a housing;

a first terminal structure extending into the housing;

a second terminal structure, the second terminal structure comprising a first conductive portion extending into the housing and a second conductive portion outside of the housing, the first conductive portion electrically isolated from the second conductive portion, a thermally activated overcurrent protection element located within the housing and configured to change shape, in response to current exceeding a breaker threshold current passing therethrough for a period of time exceeding a breaker delay period, from a closed position in which the thermally activated overcurrent protection element forms part of an electrical connection between the first terminal structure and the second terminal structure; and a fuse supported by the second terminal structure and electrically connecting the first conductive portion of the second terminal structure to the second conductive portion of the second terminal structure, the fuse comprising a fuse element configured to fuse open in response to the current exceeding a fuse threshold current for a period of time exceeding a fuse delay period, wherein the fuse threshold current is higher than the breaker threshold current, and wherein the breaker delay period is longer than the fuse delay period.

2. The device of claim 1, wherein the first conductive portion of the second terminal structure comprises a terminal extending through the housing and comprising an aperture in an externally available end of the terminal, and wherein the second conductive portion of the second terminal structure comprises a terminal stud extending through the aperture in the terminal of the second terminal structure.

3. The device of claim 2, wherein the second terminal structure includes an insulating component preventing direct electrical contact between the terminal stud and the terminal of the second terminal structure.

4. The device of claim 3, wherein the insulating component comprises an insulating sleeve covering a section of the terminal stud.

5. The device of claim 3, wherein at least a portion of the insulating component extends through the aperture in the terminal of the second terminal structure.

6. The device of claim 5, wherein the first conductive portion of the second terminal structure extending into the housing comprises a contiguous structure extending at least between the aperture and the housing.

7. The device of claim 5, wherein the first conductive portion of the second terminal structure extending into the housing comprises a generally planar structure extending at least between the aperture and the housing.

8. The device of claim 2, wherein the fuse comprises a removable fuse configured to be installed on the terminal stud and brought into contact with the externally available end of the terminal of the second terminal structure.

9. The device of claim 8, wherein the fuse comprises:

an insulating body having an aperture extending therethrough, a first conductive portion configured to be placed in electrical communication with the terminal stud;

a second conductive portion configured to be placed in electrical communication with the externally available end of the terminal of the second terminal structure; and the fuse element disposed along a conductive path between the first and second conductive portions.

10. The device of claim 9, wherein the fuse element is located on an outer face of the insulating body.

11. The device of claim 9, wherein the first conductive portion is located on a first face of the insulating body, and wherein the second conductive portion is located on a second face of the insulating body opposite the first face.

12. The device of claim 1, wherein the thermally activated overcurrent protection element is directly connected to one of the first and second terminal structures within the housing, and wherein the thermally activated overcurrent protection element is configured to be in contact with a terminal contact of the other of the first and second terminal structures within the housing when the thermally activated overcurrent protection element is in the closed position.

13. The device of claim 12, wherein the thermally activated overcurrent protection element comprises an automatically resetting bimetallic element which returns to the closed position automatically.

14. The device of claim 12, wherein the thermally activated overcurrent protection element returns to the closed position through the application of force.

15. A thermally activated overcurrent circuit breaker device, comprising:

a housing;

a first electrical terminal extending into the housing;

a second electrical terminal extending into the housing and comprising an externally available end extending in a first direction from the housing, the externally available end comprising an aperture extending therethrough;

a terminal stud for mounting a removable fuse thereon, the terminal stud extending in a second direction through the aperture in the externally available end of the second terminal, the second direction generally orthogonal to the first direction;

an insulating material electrically insulating the terminal stud from the second terminal;

a thermally activated overcurrent protection element located within the housing and configured to change shape, in response to current exceeding a breaker threshold current passing therethrough for a period of time exceeding a breaker delay period, from a closed position in which the thermally activated overcurrent protection element forms part of an electrical connection between the first electrical terminal and the second electrical terminal; and the removable fuse, the removable fuse supported by the second terminal stud and electrically connecting the second electrical terminal to the terminal stud, the removable fuse comprising a fuse element configured to fuse open in response to the current exceeding a fuse threshold current for a period of time exceeding a fuse delay period, wherein the fuse threshold current is higher than the breaker threshold current, and wherein the breaker delay period is longer than the fuse delay period.

16. The device of claim 15, wherein at least a portion of the insulating material extends through the aperture in the externally available end of the second terminal.

17. The device of claim 16, wherein the externally available end of the second electrical terminal comprises a contiguous structure extending at least between the aperture and the housing.

18. The device of claim 16, wherein the externally available end of the second electrical terminal comprises a generally planar structure extending at least between the aperture and the housing.

* * * * *